United States Patent [19]
Wolff

[11] 4,284,373
[45] Aug. 18, 1981

[54] WORKING STAND FOR NECKLESS ELECTRICAL HOME WORKER MACHINES

[76] Inventor: Robert Wolff, im Kiesacker, 5446 Engeln, Fed. Rep. of Germany

[21] Appl. No.: 74,277

[22] Filed: Sep. 11, 1979

[51] Int. Cl.[3] ........................ B23B 39/00; B23B 47/00

[52] U.S. Cl. ........................ 408/87; 408/129; 408/135; 408/712

[58] Field of Search ........................ 408/87, 88, 99, 111, 408/129, 135, 136, 712

[56] References Cited

U.S. PATENT DOCUMENTS

| | | | |
|---|---|---|---|
| Re. 24,203 | 8/1956 | Buck | 408/712 |
| 1,794,149 | 2/1931 | Collins | 408/135 |
| 2,642,760 | 6/1953 | Goldberg | 408/99 |
| 2,719,461 | 10/1955 | Hawker | 408/111 |
| 3,667,855 | 6/1972 | Douglass | 408/712 |
| 3,837,757 | 9/1974 | Levine | 408/136 |
| 3,838,935 | 10/1974 | Boyajian | 408/87 |
| 3,874,810 | 4/1975 | Russell | 408/99 |
| 4,012,162 | 3/1977 | Warren | 408/87 |

*Primary Examiner*—Harrison L. Hinson
*Attorney, Agent, or Firm*—Martin A. Farber

[57] ABSTRACT

A working stand for collarless electrical home worker machines, which machines have at the end of their drive shaft a threaded section for screwing on or attachment of a drill chuck. A machine holder is moveable up and down a vertical polygon guide column and can be fixed in position at whatever desired height. The guide column has a toothing, in which there engages a gear which is driveable by means of a hand crank, the gear being mounted in the machine holder. The machine holder has a pair of adjustable clamping jaws embracing the polygon guide column. In the machine holder a vertical shaft is rotatably mounted, which shaft on the upper end has an axially interior threaded section for reception of the drive shaft of the machine and on the lower end, which end projects from the machine holder, has a threaded section for the screw-on attachment of the drill chuck.

7 Claims, 2 Drawing Figures

WORKING STAND FOR NECKLESS ELECTRICAL HOME WORKER MACHINES

The invention relates to a working stand for collarless electrical home worker machines, which machines have at the end of their drive shaft a threaded section for screwing on or attachment of a boring socket or drill chuck.

The home worker machines which are found on the market are divided into two different basic types. Machines of one type have between the actual machine body and the drill chuck a clamping neck of a standardized outer diameter of 43 mm, which clamping neck is rigidly connected to the machine body, whereas with other machine types the drill chuck is joined directly to the machine body. For the machines with the clamping neck, in addition to other countless traditional or auxiliary or supplementary instruments, also drill stands were developed, which drill stands, in case of the neckless drilling machines, are not usable by themselves, or alone, without utilization of an adapter part.

A tentering frame for neckless home worker machine is known, which frame is disposed or lies in a plane which contains the drive shaft, surrounds or encloses the entire machine body and moreover has a bushing as a clamping neck, which bushing surrounds the drive shaft, whereas on the opposite frame side there is provided a screw apparatus for gripping or clamping the frame to the machine body. Such a frame does indeed make possible the use or application of a known operating stand even with neckless home worker machines. It is however disadvantageous that the tentering frame with neck provides no comparably stable mounting of the front end of the bearing shaft. Furthermore the frame is also frequently obstructive during the handling or working.

It is an object of the invention to create a working stand for neckless home worker machines, which stand has a high guide precision, which is easily handleable or manipulated and can be produced at optimum cost.

By the present invention this object is aided in its solution, by the combination that a machine holder (4) is moveable up and down a vertical polygon guide column and can be fixed in position at whatever desired height, the guide column (2) being provided with a toothing (3), in which toothing there engages a gear (10) which is drivable or actuatable by means of a hand crank (21), the gear (10) being mounted in the machine holder (4); the machine holder (4) has a pair of adjustable clamping jaws (16, 17), the jaws (16, 17) embracing the polygon guide column (2), and in the machine holder (4) a vertical shaft (14) is rotatably mounted, which shaft on the upper end has an axially interior threaded section (33) for reception of the drive shaft (34) of the machine (5) and on the lower end, which end projects from the machine holder (4), has a threaded section (35) for the screw-on attachment of the drill chuck (36).

The machine holder (4) has a two-shell parted housing which is divided in the center plane of the gear or in a plane which is parallel to this, both housing shells (6, 7) of the housing being clamped rigidly to one another; the rearward area of the two housing sheels is formed as the clamping jaw pair (16, 17), the clamping jaw pair (16, 17) embracing the polygon guide column, and the front area of the two housing shells (6, 7) being formed as clamping jaw pair (12, 13), the latter provided with annular grooves or annular tee-slots (28, 29), in which clamping jaw pair (12, 13) the shaft (14) is clamped, the shaft (14) being provided with two axially non-displaceable roller bearings (31, 32).

By this constructional assembly or mounting of the working stand a series of advantages are achieved. A neckless home worker machine can easily be screwed into the upper end of the shaft with its threaded section, which is located at the end of the drive shaft. The screwing-on or fastening of the drill chuck to the lower end of the shaft is equally simple, whereby the home worker machine in connection with the working stand becomes for instance a table drill machine, with which, because of the play-free abradant guiding along the polygon guide column, work can be done very exactly.

The two roller bearings which are provided nondisplaceably on the shaft are received by the annular grooves in the housing shells and permit a small-friction running of the shaft and its fixed or secure mounting in the machine holder. The bearings assume the horizontal pressure, which occurs particularly with milling work, so that the bearing of the drive shaft of the home worker machine is not loaded or stressed thereby.

Furthermore in execution of the invention, on the machine holder (4) there can be arranged an abutment stop (45) for arresting rotation of the machine (5), the abutment stop (45) resting against the machine housing.

Thereby it can be provided that the stop or abutment (45) is formed as a fork (46) which encloses, frames or embraces the machine housing, and the stem (44) of the fork can be guided movably in the machine holder (4) and can be attached firmly or secured with a clamping screw (47). By the stop or abutment the home worker machine is secured or held on the machine holder of the working stand without the entire machine being able during operation to go or shift into rotation. The displaceability of the stop permits home worker machines of differing construction to be able to be attached or mounted on the working stand.

For improved handling for example during the screwing on of the chuck drill, furthermore it is provided that between the two roller bearings (31, 32) the shaft (14) and the housing shells (6, 7) are provided with a diametric bore (38, 37, 39) for insertion or a clamping or toggle tool.

Further in accordance with the invention it can be provided that on the lower end of the shaft (14) directly above the threaded section (35) there is arranged a polygon section (40) for the joining application of a turning wrench (41).

By a tugging or jerking actuation of the turning wrench or turn handle which is joined or applied to the polygonal section, even a connection between the work stand shaft and the drive shaft of the home worker machine that has become very rigid in operation can be loosend or released. The threaded section can however be used also for the locking or securing of the shaft during the screwing on of the drill chuck.

According to further features of the invention it can be provided that the gear (10) and hand crank (21) are mounted fixed on only one shell (7) of the housing shells, whereas the other housing shell (6), provided with a bearing bore (27) for the toothed wheel shaft (20), is formed as a cover, and the toothed gear shaft (20) is provided with an axially threaded bore and being surounded by one of the housing shells (7) is screwed with the operating or control hand crank (21), and the housing shells (6, 7) are clamped or tightened together by a screw (11), the screw being arranged near the heel of the clamping jaws (12, 13) for the shaft (14). This execution of the machine holder makes possible a favorable cost in production and simple mountability or assemblability.

With the above and other objects and advantages in view, the present invention will become more clearly understood in connection with the detailed description of a preferred embodiment, when considered with the accompanying drawings, of which:

Figure 1:
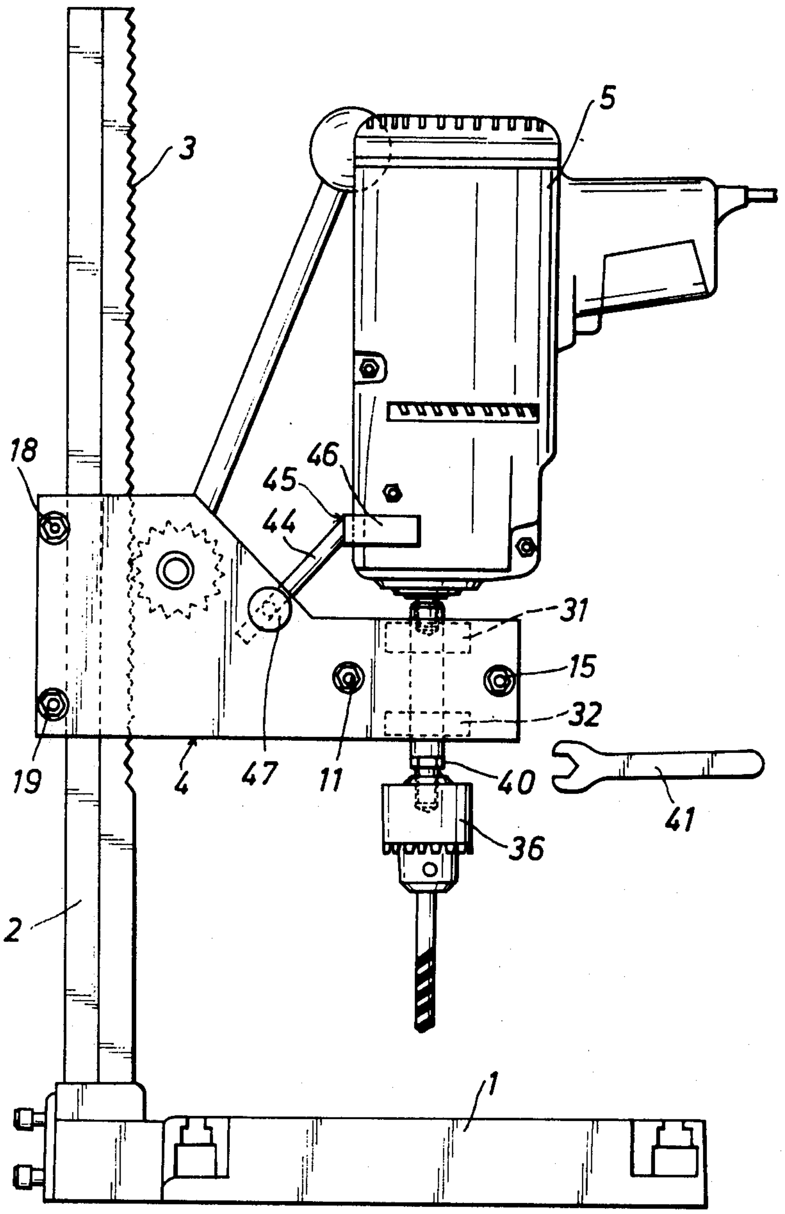
FIG. 1 is an elevational side view of an operating stand or support in accordance with the invention.

The working stand comprises a polygon guide column 2, standing on a base plate 1, which column 2 is formed in the embodiment example as a hexagonal column and carries a toothing 3. A machine holder 4 is arranged movable up and down on the guide column 2, the holder carrying on its front side a clamped-in or fixed home worker machine 5.

The housing of the machine holder 4 comprises two mirror image approximately equal or symmetrical housing shells 6, 7, which in their center areas 8, 9 are directly tightened or clamped onto one another by means of the screw 11 which is set through the two housing shells 6, 7, the shells 6, 7 enclosing a toothed wheel or gear 10. In the front range lying over the base plate 1 there is formed on or attached to each of the housing shells 6, 7, respectively, one clamping jaw or cheek 12, 13 for enclosing a shaft 14. The clamping jaws 12, 13 are cooperatively clamped or held together by means of a screw 15. At the opposite end the housing shells 6, 7 are provided with comparatively long prismatic clamping jaws 16, 17, which clamping jaws 16, 17 together form an inner profile which is adjusted or fitted to the hexagonal guide column 2, whereby during the clamping two diametrically opposite edges of the guide column 2 are received by V-grooves or slots of the clamping jaws 16, 17. The strength of the clamping tension or tightening for the clamping jaws 16, 17 is adjustable by means of the screws 18, 19.

The gear or toothed wheel 10, which toothwheel 10 meshes into the toothing 3, is secured or fixed on a hollow shaft 20, the latter being provided with an axially threaded bore. An angular or angle-shaped hand crank 21 is inserted with its front end through a bore 23 of the housing shell 7 (which bore is equipped or lined with a bearing bushing 22), is screwed into the hollow shaft 20 and is secured by means of a counter or cotter nut 24. On the outer side of the housing shell 7 on the hand crank shaft a graduated collar 25 is seated, which collar is carried along during the rotation of the hand crank 21 by friction-tightness or a friction tight engagement, yet it can be twisted or turned by hand upon overcoming the friction. A bore 27 is formed in the housing shell 6, the bore 27 being provided with a bearing bushing 26. The hollow shaft 20 is mounted in the bore 27.

In the front area of the two housing shells 6, 7 there are respectively provided one half each of two horizontal annular grooves 28, 29, which grooves are separated from one another by an annular groove 30 of smaller diameter. The annular grooves 28, 29 serve for the reception of roller bearings 31, 32, which for example are shrunk-fit onto the shaft 14. The roller bearings can be formed as roller or ball bearings; instead of two roller bearings one wide roller bearing could be provided on the shaft, which wide roller bearing then would be enclosed in a correspondingly widely formed annular groove between the housing shells 6, 7. The annular groove 30 serves for the free rotatability of the shaft 14, the latter being somewhat smaller in diameter. The shaft 14 is provided on one end with an interior threaded section 33, into which section 33, there is screwed the end 34 of the drive shaft of the home working machine 5, which end 34 is provided with a threading. On the lower end the shaft 14 carries a threaded section 35 for screwing-on a drill chuck or boring socket 36. Between the two roller bearings 31, 32 the shaft 14 is provided with a diametric bore 37, which bore can be aligned or directed flushly with the through-holes 38, 39 in the housing shells 6, 7. For example a locking, toggle or clamping tool can be inserted through the bores 38, 37, 39, by means of which tool the shaft 14 is secured or locked during the screwing-on or unscrewing of the drill chuck. At the lower end directly above the threaded section 35 the shaft 14 is provided with a polygonal section 40, on which section 40 a turning or turn handle 41 can be applied or joined. With the turning wrench the shaft 14 either can be secured, or retained or it can be released or loosened by a back-type jerking or tugging turning of the threaded section 34 of the home worker machine 5.

Grooves 42, 43 are formed inclined in the housing shells 6, 7, which grooves serve to receive the stem 44 of an abutment or stop 45. The stop 45 is constructed in the form of a fork 46 embracing the machine housing of the home worker machine 5 and serves to arrest the rotation of the home worker machine 5 itself. For the adjustment of the stop 45 to different home worker machines, the stem 44 is displaceably guided in the grooves 42, 43 and the stem 44 can be fixed on the machine holder 4 by means of a clamping screw 47 engaging the stem.

Figure 2:
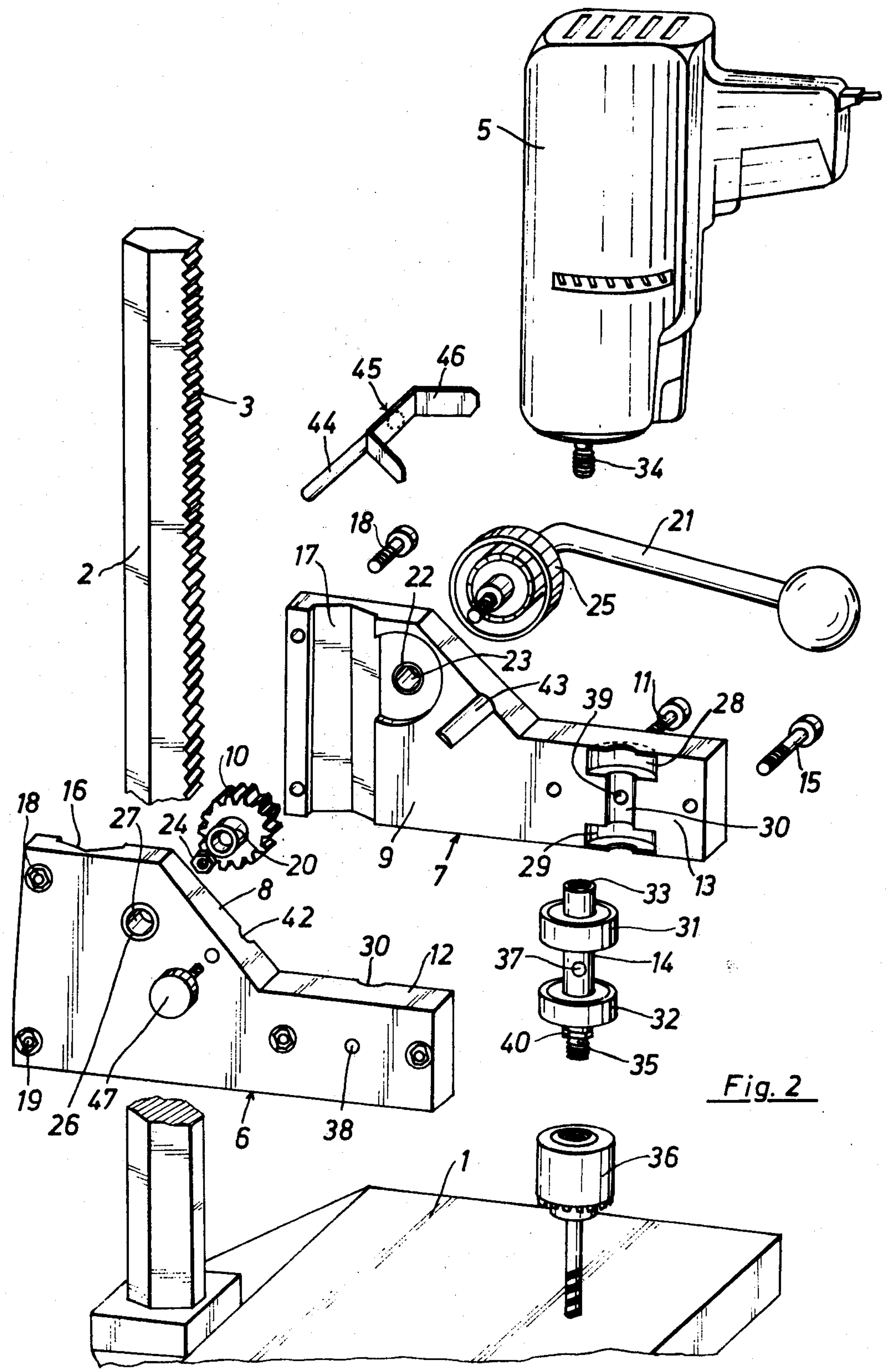
FIG. 2 is an exploded perspective illustration of the working stand.

As immediately evident from FIG. 2, at first the entire machine holder construction assembly can be mounted on the housing shell 7, whereby then in a final working operation the other housing shell 6 is mounted on as a cover, whereby the hollow shaft 20 is received by the bearing bore 27, the latter being encased with the bearing bushing 26. The roller bearings 31, 32 lying in the grooves 28, 29, are clamped or fastened by the clamping jaws 12, 13, and position the shaft 14 non-displaceable in the axial direction.

While I have disclosed embodiments of the invention, these embodiments are given by example only and not in a limiting sense.

I claim:

1. A working stand for collarless electrical home worker machines, which machines have at the end of their drive shaft a threaded section for screwing on a drill chuck, comprising a vertical guide column having a polygonal cross-section and a toothing, a machine holder disposed moveably up and down said vertical guide column and fixable in position at any height on the guide column, a gear mounted in said holder and engaging said toothing, said gear constituting means actuatable by a hand crank, said machine holder comprises a pair of adjustable clamping jaws embracing said guide column, a vertical shaft is rotatably mounted in said machine holder, said shaft on an upper end has an axially interior threaded section means for reception of the drive shaft of the machines and said shaft on its lower end has another threaded section means for screwing-on the drill chuck, said lower end of said shaft projects from the machine holder, said machine holder comprises a housing formed of two housing shells, the housing being divided in a center plane of the gear or in a plane which is parallel to said center plane, both said shells of the housing are clamped rigidly to one another, a rearward area of said two housing shells is formed as said clamping jaws, said clamping jaws embrace said guide column, and a front area of said two shells is formed as another pair of clamping jaws, the latter being formed with annular grooves, said shaft is rotatably clamped in said another pair of clamping jaws, two axially non-displaceable roller bearings are disposed on said shaft and in said annular grooves.

2. The working stand as set forth in claim 1, further comprising an abutment stop means for arresting rotation of the machines, said abutment stop means rests against a housing of the machines and is mounted on said machine holder.

3. The working stand as set forth in claim 2, wherein said abutment stop means is formed as a fork having a stem of the fork displaceably guided in said machine holder, a set screw means for fixing said abutment stop means in said machine holder.

4. The working stand as set forth in claim 1, wherein between said two roller bearings, said shaft and said two housing shells are formed with an aligned diametric bore adapted for insertion of a toggle tool therein.

5. The working stand as set forth in claim 4, wherein a polygon section adapted to be joined with a turning wrench is disposed on the lower end of the shaft directly above said another threaded section means.

6. The working stand as set forth in claim 1, further comprising a gear shaft disposed on said gear, a hand crank means operatively engages said gear for driving and control of the latter, said gear and said hand crank means are mounted firmly on only one of said two shells of the housing, whereas the other of said two housing shells is formed with a bearing bore for said gear shaft, the latter is mounted in said bearing bore, said other of said two shells is formed as a cover.

7. The working stand as set forth in claim 6, wherein said gear shaft is formed with an axially threaded bore and is surrounded by said one of said two housing shells, said hand crank means is screwed to said gear shaft, and screw means for clamping said two housing shells together, said screw means is arranged near a heel of said another pair of clamping jaws for said shaft.

* * * * *